US006283368B1

United States Patent
Ormerod et al.

(10) Patent No.: US 6,283,368 B1
(45) Date of Patent: Sep. 4, 2001

(54) HIGH SPEED CUSTOMIZING MACHINE

(75) Inventors: Simon Ormerod, Loury; Gerard Nioche, Clery Saint Andre; Stephane Medioni, Antony, all of (FR)

(73) Assignee: Gilles Leroux S.A., Semoy (FR)

( * ) Notice: Subject to any disclaimer, the term of this patent is extended or adjusted under 35 U.S.C. 154(b) by 0 days.

(21) Appl. No.: 09/145,280

(22) Filed: Sep. 2, 1998

(51) Int. Cl.[7] .................................................. G06K 5/00
(52) U.S. Cl. ............................................. 235/380; 235/449
(58) Field of Search .................................. 235/380, 381, 235/479, 480, 493

(56) References Cited

U.S. PATENT DOCUMENTS

| | | | |
|---|---|---|---|
| 4,677,667 | * | 6/1987 | Nagata et al. ........................... 379/63 |
| 4,798,945 | * | 1/1989 | Bruckner et al. ...................... 235/479 |
| 4,814,592 | * | 3/1989 | Bradt et al. ............................ 235/381 |
| 4,827,425 | * | 5/1989 | Linden .................................. 364/478 |
| 4,851,654 | * | 7/1989 | Nitta ..................................... 235/492 |
| 4,866,259 | * | 9/1989 | Bonnemoy ............................ 235/441 |
| 4,940,418 | * | 7/1990 | Shimizu et al. ....................... 439/259 |
| 4,968,873 | * | 11/1990 | Dethloff et al. ...................... 235/380 |
| 5,206,495 | * | 4/1993 | Kreft .................................... 235/492 |
| 5,332,889 | * | 7/1994 | Lundstrom et al. .................. 235/380 |
| 5,378,884 | * | 1/1995 | Lundstrom et al. .................. 235/441 |
| 5,397,426 | * | 3/1995 | Nioche et al. ........................ 156/514 |
| 5,484,997 | * | 1/1996 | Haynes ................................. 235/492 |
| 5,550,361 | * | 8/1996 | Huis et al. ............................ 235/440 |
| 5,574,273 | * | 11/1996 | Nakagawa et al. ................... 235/492 |
| 5,598,032 | * | 1/1997 | Fidalgo ................................ 257/679 |
| 5,773,812 | * | 6/1998 | Kreft .................................... 235/492 |
| 5,799,316 | * | 8/1998 | Audren ................................. 707/104 |
| 5,837,991 | * | 11/1998 | LaManna et al. .................... 235/475 |
| 5,889,941 | * | 3/1999 | Tushie et al. ......................... 395/186 |
| 5,920,055 | * | 7/1999 | Roth et al. ............................ 235/380 |
| 5,929,414 | * | 7/1999 | Saitoh .................................. 235/380 |
| 5,943,238 | * | 8/1999 | Nioche et al. ................... 364/468.28 |
| 5,969,318 | * | 10/1999 | Mackenthun ........................ 235/380 |
| 5,969,332 | * | 10/1999 | Ueda et al. ........................... 235/492 |

FOREIGN PATENT DOCUMENTS

| | | |
|---|---|---|
| 0 256 921 | 2/1988 | (EP) . |
| 0 589 771 A1 | 3/1994 | (EP) . |
| 94/15306 | 7/1994 | (WO) . |

* cited by examiner

Primary Examiner—Karl D. Frech
Assistant Examiner—Daniel St. Cyr
(74) Attorney, Agent, or Firm—Nixon & Vanderhye (57) ABSTRACT

This invention relates to a high speed customizing machine which has a device for transferring portable objects and incorporates an integrated circuit having at least one memory, and a rotary platform equipped with a plurality of hybrid connection devices, positioned transversely to the transfer device and each linked to an electronic card. Each electronic card enables customization of each chip card and is positioned in front of each connection device.

17 Claims, 6 Drawing Sheets

HIGH SPEED CUSTOMIZING MACHINE

BACKGROUND OF THE INVENTION

This invention relates to a high speed customizing machine.

Customizing machines for portable objects such as chip cards, in particular so-called "intelligent" chip cards, that is, those which incorporate a microprocessor or a microcomputer, are known. However, these chip cards—which initially communicated with the outer world via a contact strip—are evolving towards the use of contactless strips with applications requiring a relatively high degree of security. Thus, transmissions between the integrated circuit of the chip card and the terminal can be effected by non-contact devices such as antennas incorporated in the chip card.

The object of this invention is a customizing machine which will customize chip cards of any type, either with or without contact, or even hybrids, that is, incorporating transmission both with and without contact.

SUMMARY OF THE PRESENT INVENTION

This object is achieved by the fact that the high speed customizing machine which has a device for transfer of a portable object and incorporates an integrated circuit having at least one memory, is characterized in that it has a rotary platform equipped with a plurality of hybrid connection devices, positioned transversely to the transfer device and each linked to an electronic card, each electronic card allowing for customization of each chip card and being positioned in front of each connection device.

According to another characteristic, each connection device has a plate integral with the revolving platform, incorporating a transmitting and receiving antenna and a mobile assembly guided in translatory motion towards the stationary plate and containing a connection head, said mobile assembly being continuously acted upon by an impression device in the direction of the plate which is integral with the revolving platform.

According to another characteristic, each hybrid connection device is successively moved to a loading and unloading station.

According to another characteristic, each electronic card has an interface circuit with an antenna linked by a bus to a microprocessor which executes a customizing program, said bus also allowing the microprocessor to access the contact connection device of the associated hybrid connection device.

According to another characteristic, the bus of the electronic card is also linked by a connector to a security card for customizing the security function.

According to another characteristic, the bus of the electronic card is networked by an interface linked by a rotary connector to a computer which manages the customizing assembly and controls the transmission of the customizing parameters of each card.

According to another characteristic, each electronic card has means for switching of customizing data to the link device adapted to the type of chip cards to which the customizing card will be linked.

According to another characteristic, the platform has means for driving and angular positioning which allow each plate to stop at the height of the portable objects and in alignment with the means for guiding the transfer of the portable objects.

According to another characteristic, the machine has means for controlling the progress from one station to another of the transfer device and stoppage of a portable object opposite the connection device moved into the path of the transfer device.

According to another characteristic, the machine has means for controlling the sequencing and management of customization.

Another object of the invention is a customizing machine which allows a number of chip cards to be customized at high speed, while ensuring continuity of the customizing numbers of the cards.

This object is achieved in that means for sequencing control trigger a substitution sequence when the customizing management means indicate that a portable object has not been customized, at least one connection device located in one position of the platform being kept in a reserve position and loaded with a reserve portable object, the management and customizing means initiating customization of the portable object of this reserve position when the management means have detected the absence of customization on another card called "defective" located in a connection device.

According to another characteristic, the machine has a card unstacking device at the input of the machine, a stacking device at the output of the machine, an electrical test station between the customizing platform and the unstacking device, and an ejection station before the station which loads onto the customizing platform. (It can also be located after the latter).

According to another characteristic, the machine has an ejection station at the output of the customizing platform.

According to another characteristic, the ejection station is activated when a card with defective customization passes in front of this station.

BRIEF DESCRIPTION OF THE DRAWING FIGURES

Other characteristics and advantages of this invention will be evident in the description which follows with reference to the following attached diagrams in which.

DETAILED DESCRIPTION OF THE INVENTION

Figure 1:
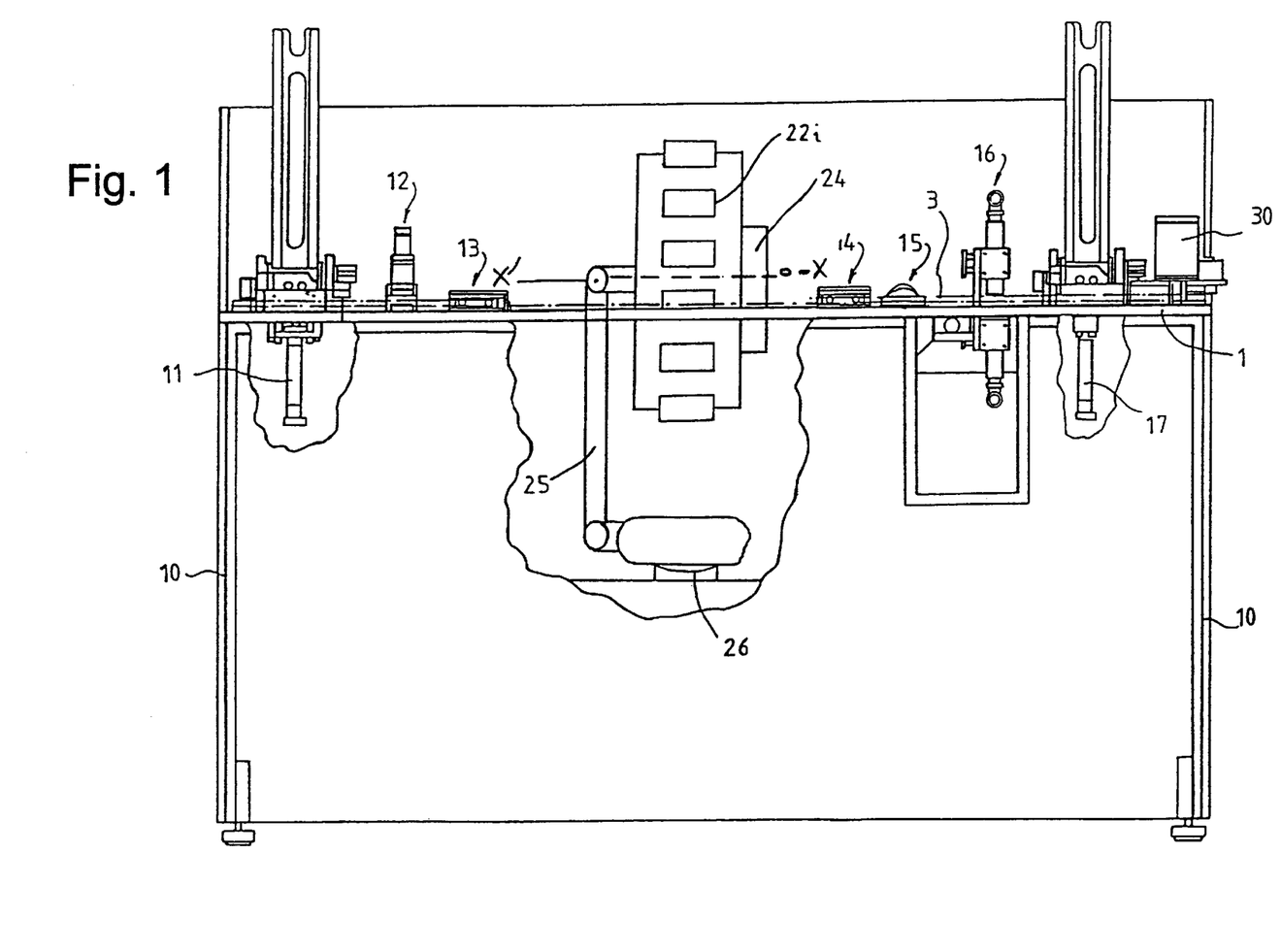
FIG. 1 shows a front view of the front of the customizing machine.
Figure 2:
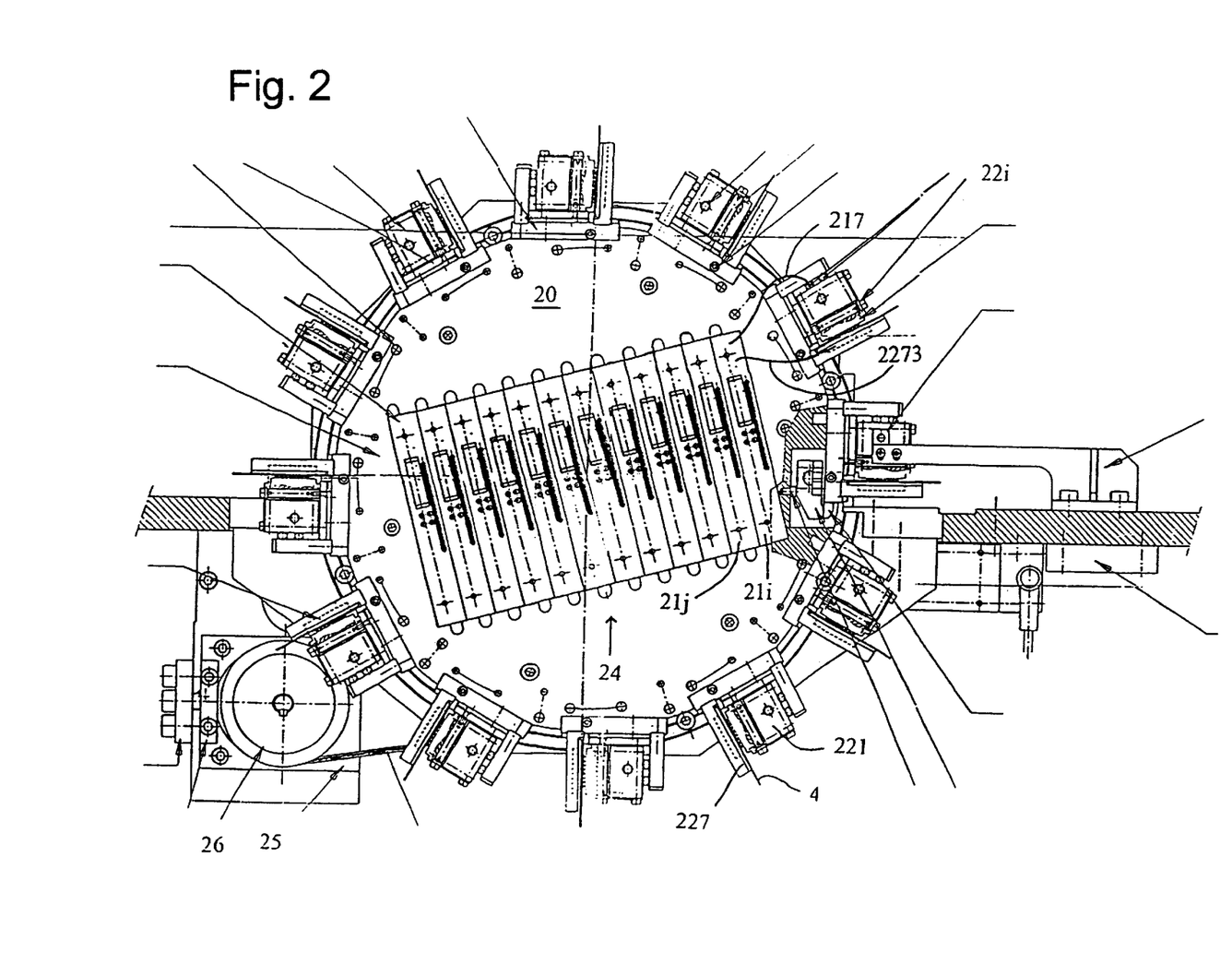
FIG. 2 shows a side view of the front of the customizing machine.
Figure 3:
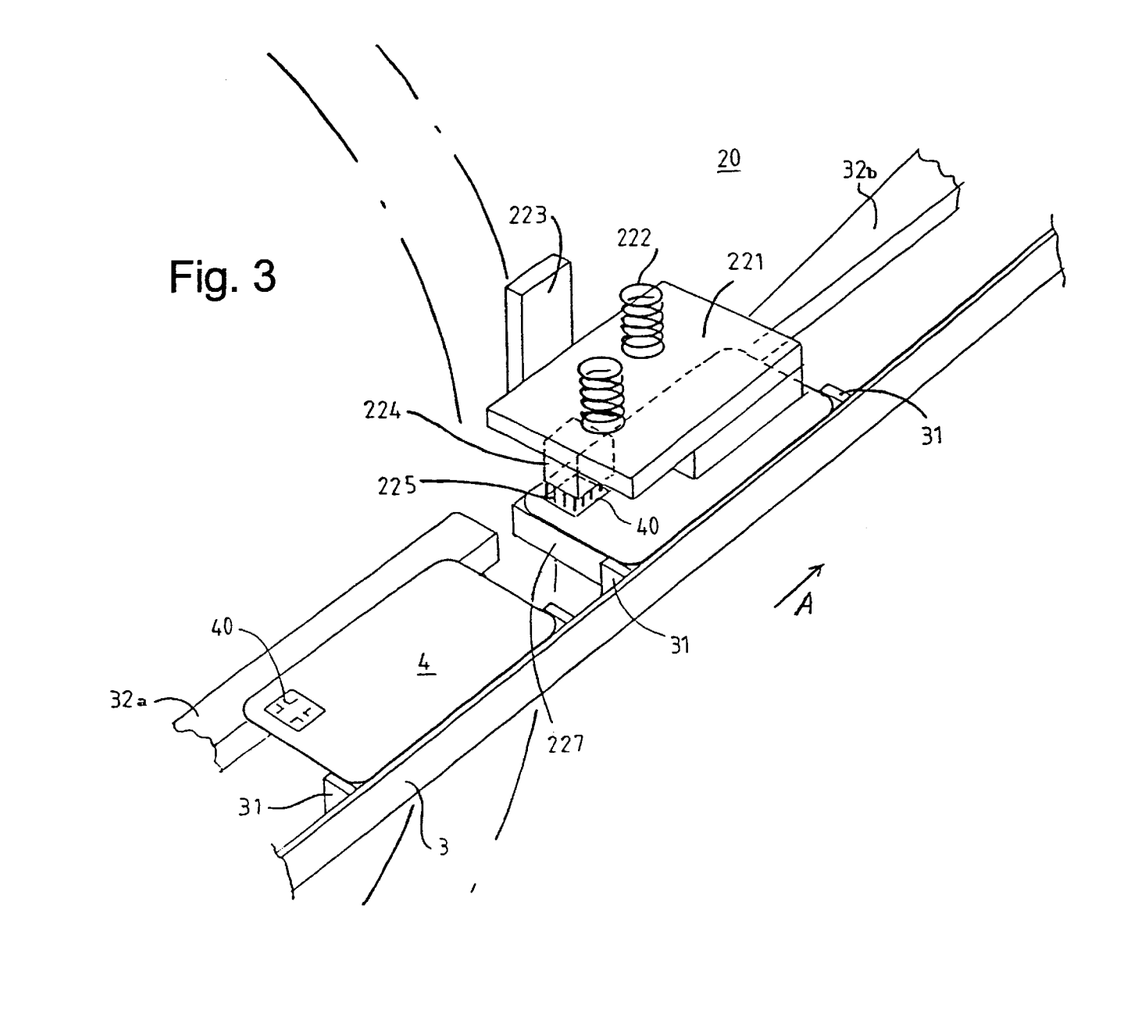
FIG. 3 shows an overhead view of the station which inserts the cards into the customizing platform.
Figure 4:
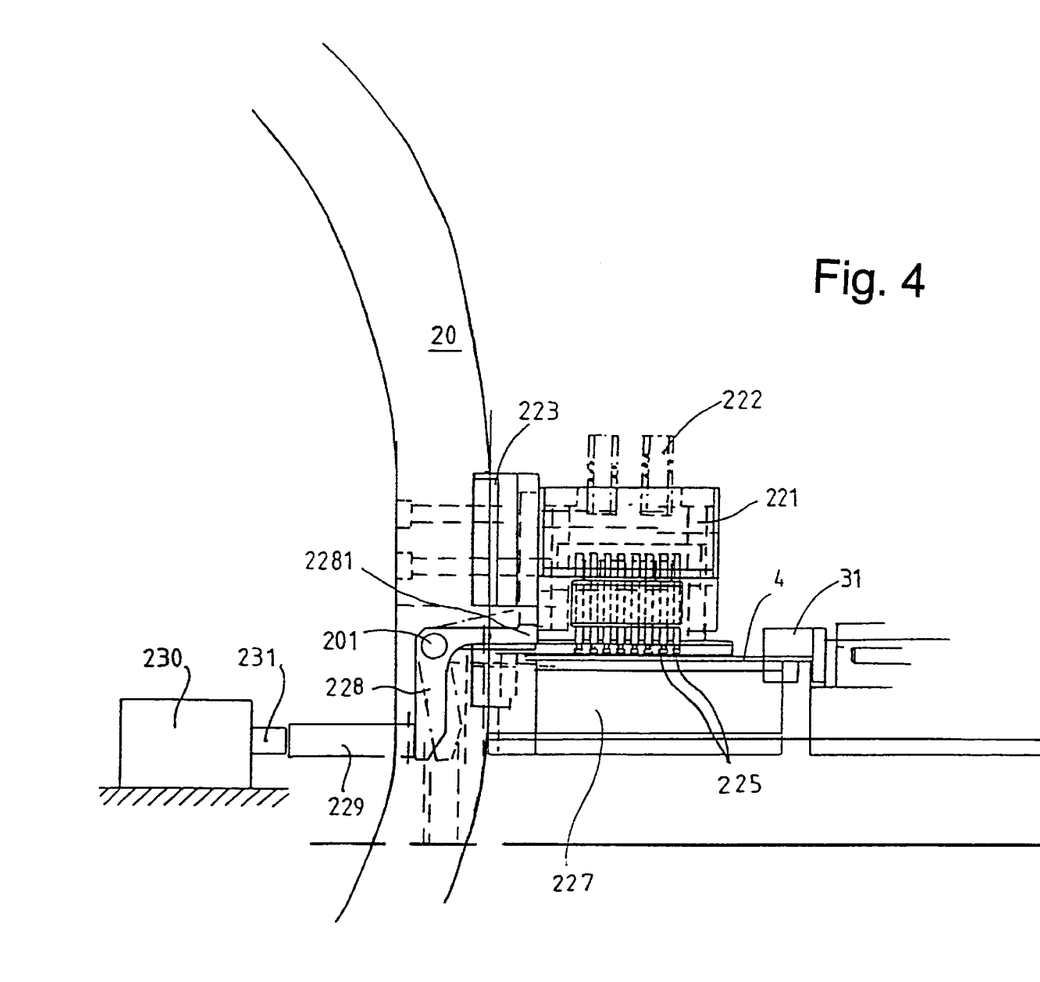
FIG. 4 shows a left side view of one of the connection heads of the customizing platform.
Figure 5:
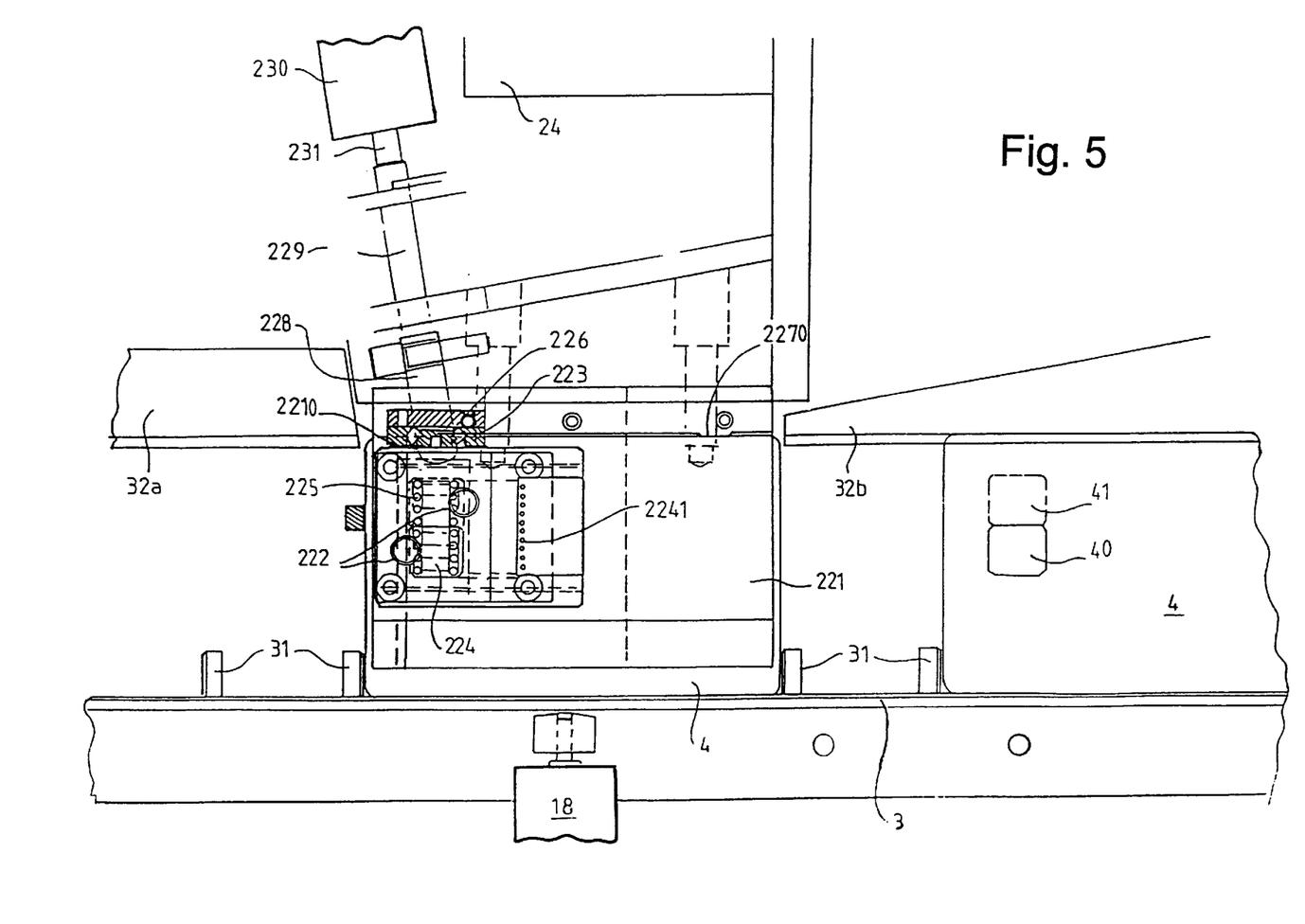
FIG. 5 shows a top view of the customizing platform and the transfer path.
Figure 6:
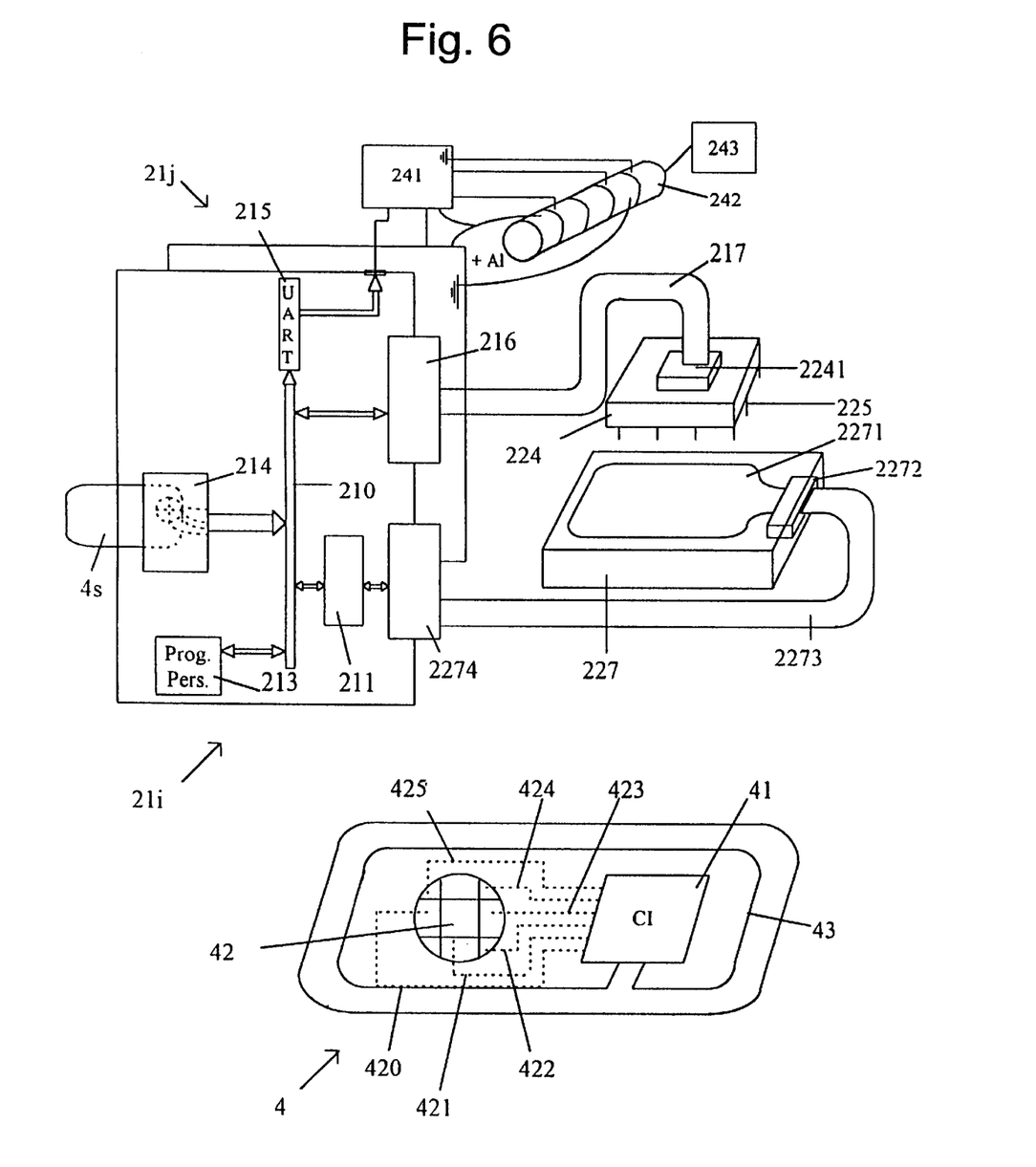
FIG. 6 shows the schematic of the electronic circuits necessary for customization of contact, contactless and hybrid cards.

The invention which will be described in association with FIGS. 1 through 6 is comprised of table (1) mounted on feet (10) on the platform from which there is a transfer path formed by continuous synchronous belt (3) revolving between two end pulleys (33, 32), one of which is driven by motor (30).

Mounted on this continuous belt (3) at regular intervals, in pairs, are catches (31), the distance between two consecutive catches (31) corresponding to the length of portable object (4) with the size of a credit card, hereinafter called a chip card. Each pair of catches (31) separated by the length of a credit card is adjacent to the following pair of a shorter length. Catches (31) hold portable objects (4) during movement on the advance part of the path shown by arrow (A) in FIG. 3 and driving of chip cards from one station to another. For more detail on catches (31) and the transfer device, refer to European patent application 0 589 771 of the same applicant. As is evident from FIGS. 5 and 3, the transfer path has support rails (32a, 32b) which are interrupted at the loading/unloading station to allow for passage of connection heads (22i) joined to revolving platform (20) as will be described later.

The table has unstacking device (11) which, starting with a batch of stacked cards, distributes the cards and inserts them one by one between each pair of catches (31). The cards inserted in this way into the transfer path are then moved to an electrical test station (12) which performs a simple electrical test to eliminate bad cards, thereby ensuring initial rapid detection within a period for example of roughly 0.5 seconds. Unstacker (11) has a double input hopper allowing continuous supply to the machine, exchange of hoppers being done in masked time. Each hopper is portable with a capacity, for example, of 500 cards. Tested cards (4) are then transferred to ejection station (13) which allows ejection of bad cards, reducing the number of defective cards from 4 o/oo to 2 o/oo. The cards having passed the electrical test are then transferred from ejection station (13) to customizing station (2). This customizing station includes rotary platform or drum (20) with an axis of rotation which is horizontal and parallel to the platform of table (1) such that platform (20) and connection heads (22i) are positioned perpendicular to the transfer path oriented as shown by arrow (A). This rotary platform (20) on its periphery supports a plurality of connection devices (22i, 22n) such that each connection device (22i, 22n) can intervene in the path of the cards between card arrival guide rail (32a) and guide rail (32b) at the output of the customizing system formed by rotary platform (20). Connection devices (22i) are slightly smaller than the cards and have a space between their outer edge and synchronous belt (3). A device, for example an actuator device, allows correct positioning of each card once it has been moved between the two components of hybrid connection device (22i) supported by reference surfaces (2270) of fixed part (227) of the connection device. Each hybrid connection device (22i) for chip card (4) includes fixed platform (227) integral with rotary platform (20), and guide column (223) integral with platform (20) to guide mobile element (221) which supports contact connection head (224). Each contact connection head (224) includes a plurality of contact pins (225) mounted on elastic means and electrically connected to connector (2241) which connects to wire net (217) coupled by another connector (216) to electronic customization card (21i) which also manages connection head (224). Customization card (21i) located in a rack integral with rotary platform (20) is connected to each connection head (224) of hybrid connection device (22i). Fixed platform (227) is composed of a nonconductor such as plastic and includes a potted transmitting and receiving antenna (2271) which is connected by connector (2272) and wire net (2273) to second connector (2274) plugged into electronic customization card (21i). This electronic card includes antenna interface circuit (211) located between card bus (210) and connector (2274). This antenna interface circuit (211) can be of the type marketed by Philips as MFCM 200. Bus (210) is likewise connected to connector (216) to communicate with the contact part of chip cards (4). The bus is also coupled to customization card microprocessor (212) which executes the customization program of the electronic chip card, which program is loaded into memory (213) of card (21i). Memory (213) can possibly be integrated with processor (212) or as shown in the figure, can be connected to the processor by bus (210). Finally, microprocessor (212) likewise has, via bus (210) and connector (214) coupled to this bus (210), a security chip card designed to provide the security information necessary for customization of security applications. Finally, bus (210) of each card is connected by interface (215) of the UART type to motherboard computer (241). Mobile part (221) of hybrid connection device (22i) with a chip card is continuously acted upon in terms of its contact part in the direction of fixed part (227) by elastic means (222) which are supported on the fixed part of platform (20). End (2281) of L-shaped lever (228) acts on guide (2210) integral with head (224) and mobile part (221) to raise head (224) and provide between contact pins (225) and fixed part (227) a space sufficient to allow passage of cards (4) transported by the transfer path and synchronous belt (3) and thus support card loading and unloading. Lever (228) is actuated to raise connection head (224) by finger (229) integral with rotary platform (20) opposite each lever (228) linked to each connection device (22i). When hybrid connection device (22i) positions itself at the card insertion and removal station, by intervening in the transfer path between input guide (32a) and output guide (32b), the actuating finger of lever (228) is opposite actuator (or other actuation device) (230) with piston (231) which raises the heads. This allows release of chip card (4), then by movement of belt (3) in the direction of arrow (A) FIG. 3, movement of the customized card and at the same time routing the following chip card in connection device (22i) which ends customization. The customized card leaving the platform is transported by belt (3) towards ejection station (14). This ejection station (14) allows elimination of cards with incomplete or defective customization. If customization has been successful, the card is transferred to return station (15) to then allow its inked printing by printing station (16) on its other side. Finally the card is transported to classical unstacking device (17) where it is unstacked into a double hopper which operates on the same principle as stacking device (11), but in reverse. Rotary platform (20) can thus include a large number of connection devices (22i) each linked to electronic customization card (21i) which manages customization of chip card (4) inserted by transfer belt (3) into hybrid connection device (22i) to which customization card (21i) is linked. Thus, the platform can include, for example, 32, 24, 16, 12 or 6 connection devices (22i) linked to the same number of customization cards, each of the customization cards being networked to a computer dedicated to customization. The link between the rotating loaded system and the stationary installation is supported by rotary collector (242). The connection is made by fixed contacts integral with the fixed part of the machine resting on a set of rotary tracks integral with the rotary platform. Likewise the power necessary for operation of the equipment loaded on the rotary platform is supplied by fixed contacts which rest on the power supply tracks. This computer includes software for management of card customization and likewise allows management of inked printing.

Finally, another PC (243) manages sequential machine control and receives data from various positioning devices, such as the angular encoder of the position of platform (20), and various detection devices which ensure positioning of the card transported by belt (3) opposite the proper station and detection of the position of connection (3). The axle of rotation of platform (20) is driven by synchronous motor (26) via synchronous belt transmission (25). The positions of connection devices (22$i$) are tracked by a coding system which is not shown.

In operation the device for transfer to belt (3) removes one card (4) with completed customization from rotary platform (20) and inserts an new chip card into connection device (22$i$) with a position which has just be cleared. After insertion of the card there is a rotation from one position of platform (20). Customization lasts a minimum time which may correspond to the entire period of one complete turn. After a sufficient fraction of a turn of platform (20) the customized card is returned to the transfer path between two free catches (31). Then this card is removed from connection device (22) by movement of transfer belt (3) after raising of head (25) and imprinter (221). When platform (20) includes a set of 32 connection devices and when the speed from one station to another is roughly one card per second, the machine makes it possible to reach a customization capacity of 3000 cards per hour with a maximum customization time of roughly 32 seconds. Customization can be done with so-called "chip" or "integrated circuit" cards, the integrated circuit of which is linked to the external world either by contacts (42) with contact zones which are each connected by respective conductors (420 to 425) to the inputs of the integrated circuit (41), or by antenna (43). In this case the card is called "contactless" and communicates by radio waves with another antenna connected either to a terminal or to the customization machine. But the card can be hybrid and at the same time can include a means of connection to a terminal or to the customization machine without contact by electromagnetic waves. Thus, the customizing machine using contacts (225) or using antenna (2271) can customize contact cards, contactless cards, and hybrid cards.

The customization program recognizes the type of cards and in its algorithm has the instructions necessary for addressing via bus (210) respective (2274) connector (216) which corresponds to the type of contact card or contactless card. In the case in which the cards are "hybrid", the customization program will provide access to the card by contact connector (216) for customization of certain "non-security" parts and will access the card by connector (2274) which links with the antenna for transmitting security information by the contactless part. This security information will be extracted from security card (4$s$) by connector (214) during customization of the so-called "security" functions or applications. Thus the customization program will include means of selectively addressing and selectively controlling the addressing of information on one or more of the connectors.

Another embodiment of the invention could be composed of an electronic switching device which will be controlled by customization program information, making it possible to know what type of card is involved, contact cards or contactless cards or hybrid card, and depending on the operation in progress during customization, to validate access of the bus for one of three connectors, (216) so-called "contact", (2274) so-called "contactless" and (214) so-called "security card".

Another embodiment of the invention can consist in providing in the customization program the means of determining the card type during its positioning in front of the connecting device linked to the electronic customization card. In this case these means could comprise a procedure which consists in sending a message on the contact device and after a certain delay checking whether the card has answered. In the absence of a response, it is deduced that the card is of the "contactless type". On the transmission antenna the program sends information and after a certain time, reads the possible response sent by the card. In the case in which there is a response, the program knows that it has a contactless card to customize.

In the case in which there is no response, the device decides that no card is present. In the case in which the contact device resends a chip card response to the customization card, the program goes on to send a message to the transmission antenna to determine if the card is of the "hybrid" type. In the case in which the response is negative for this last test, the program decides that the program is of the "contact card" type.

Any modification by one skilled in the art is likewise part of the spirit of the invention. The fact that each customization card is loaded onto the rotary platform makes it possible to customize the cards more quickly by shortening the transmission delays between the customizing hardware and chip cards to be customized. Likewise the fact of having to transmit only the customization parameters and having on each card a loaded customization program likewise improves the throughput of the machine. Finally, use of a specific connector on each customization card to allow positioning of a security card which furnishes the security data necessary to security customization operations improves the reliability and security of the customization operations.

What is claimed is:

1. A high speed customizing machine comprising a transfer device for transferring portable objects along a predetermined path, each portable object having a contact connector, a contactless connector or both contact and contactless connectors, each said portable object incorporating an integrated circuit having at least one memory, a moving platform having a plurality of hybrid connection devices each comprised of a contact connector and a contactless connector positioned after movement of said platform transversely to the path of the portable objects transferred by the transfer device into confronting relation with the portable objects, each of said hybrid connection devices being connected to a respective electronic card, each electronic card being connected to a computer dedicated to customization and comprising a microprocessor for executing a customization program loaded into a memory of said electronic card for customizing each portable object confronting each hybrid connection device, said customization program recognizing the type of each said portable object as having contact, contactless or both contact and contactless connectors for customization of each said portable object via a bus, said bus being connected to a predetermined connector of said contact or contactless connector of each said hybrid connection device in accordance with the recognized type of connector on the portable object.

2. A machine as claimed in claim 1, wherein said memory is integrated with said microprocessor or is connected via the bus to said microprocessor.

3. A machine as claimed in claim 1, wherein a security chip card is designed to provide security information necessary for customization of security applications of each said portable object via said bus and said contactless connector of each said hybrid connection device.

4. A machine as defined in claim 3, wherein when the portable object has both said contact and contactless connector, said customization program access to said portable object by said contact connector of said hybrid connection device for customization of certain "non-security" information and access said portable object by said contactless connector of said hybrid connection device for transmitting security information extracted from said security chip card.

5. A machine as claimed in claim 1, wherein each hybrid connection device comprises a surface integral with the moving platform, said surface having a transmitting and receiving contactless connector for establishing a communication with the contactless connector of a portable object and a mobile assembly guided in translatory motion towards the surface and having connection heads for establishing contact with a contact connector of the portable object.

6. A machine as claimed in claim 5, including means for guiding the portable objects on the transfer device, and means for driving and positioning said moving platform to enable each surface to stop at the height of a portable object on said transfer device and in alignment with said guiding means.

7. A machine as claimed in claim 5, including means for biasing the mobile assembly in the direction of said surface, and means for actuating said mobile assembly in a direction opposite the direction of said biasing means.

8. A machine as claimed in claim 7, including a portable object unstacking device at an input of the transfer device, a stacking device at an output from the transfer device of the machine, an electrical test station between said moving platform and said unstacking device, and an ejection station before a station for loading portable objects onto the customizing moving platform.

9. A machine as claimed in claim 8, wherein the ejection station is activated when a portable object with a defective customization is moved in front of this station.

10. A machine as claimed in claim 1, wherein said microprocessor comprises switching means for switching customizing data of the customizing program in accordance with the recognition of the type of connector, said contact, contactless or hybrid connector on the portable object made by said customization program.

11. A machine as claimed in claim 1, wherein the moving platform is actuated by means which successively move each hybrid connection device to a loading and/or unloading station.

12. A machine as claimed in claim 1, wherein said bus of the electronic card is connected through a network by an interface connected by a rotary connector to the computer, said computer managing the customizing informations and controlling transmission of customizing parameters of each portable object to be customized.

13. A machine as claimed in claim 1, wherein the moving platform has an axis of rotation parallel to the path of the portable objects on the transfer device enabling replacement of a customized portable object by a portable object to be customized in the same sequence.

14. A machine as claimed in claim 1, including means for controlling movement of the portable objects from one station to another of the transfer device and stoppage of said portable object opposite hybrid connection device when in the path of the transfer device.

15. A machine as claimed in claim 14, including a second ejection station at the output of the moving platform.

16. A machine as claimed in claim 1, comprising means for controlling the sequencing and the management of customization.

17. A machine as claimed in claim 16, wherein the means for sequencing control triggering a substitution sequence when the customizing management means indicate that a portable object has not been customized, at least one hybrid connection device located in one position of the moving platform being kept in a reserve position and loaded with a reserve portable object, said management and customizing means initiating customization of the portable object of this reserve position when the management means have detected defective customization of a portable object located in a hybrid connection device, said sequencing control means causing unloading of the customized portable objects positioned prior to the defective portable object, then unloading of the defective portable object and a cycle of customization on the portable object of the reserve position unloaded at the end of the cycle of customization on the transfer device, then loading of a new reserve portable object onto this position before resuming the reserve position, allowing the unloading of the portable object positioned immediate after the defective portable object.

* * * * *